J. H. NEAL.
SAFETY DEVICE FOR AUTOMOBILES.
APPLICATION FILED MAR. 25, 1915.
1,200,750.
Patented Oct. 10, 1916.
2 SHEETS—SHEET 1.
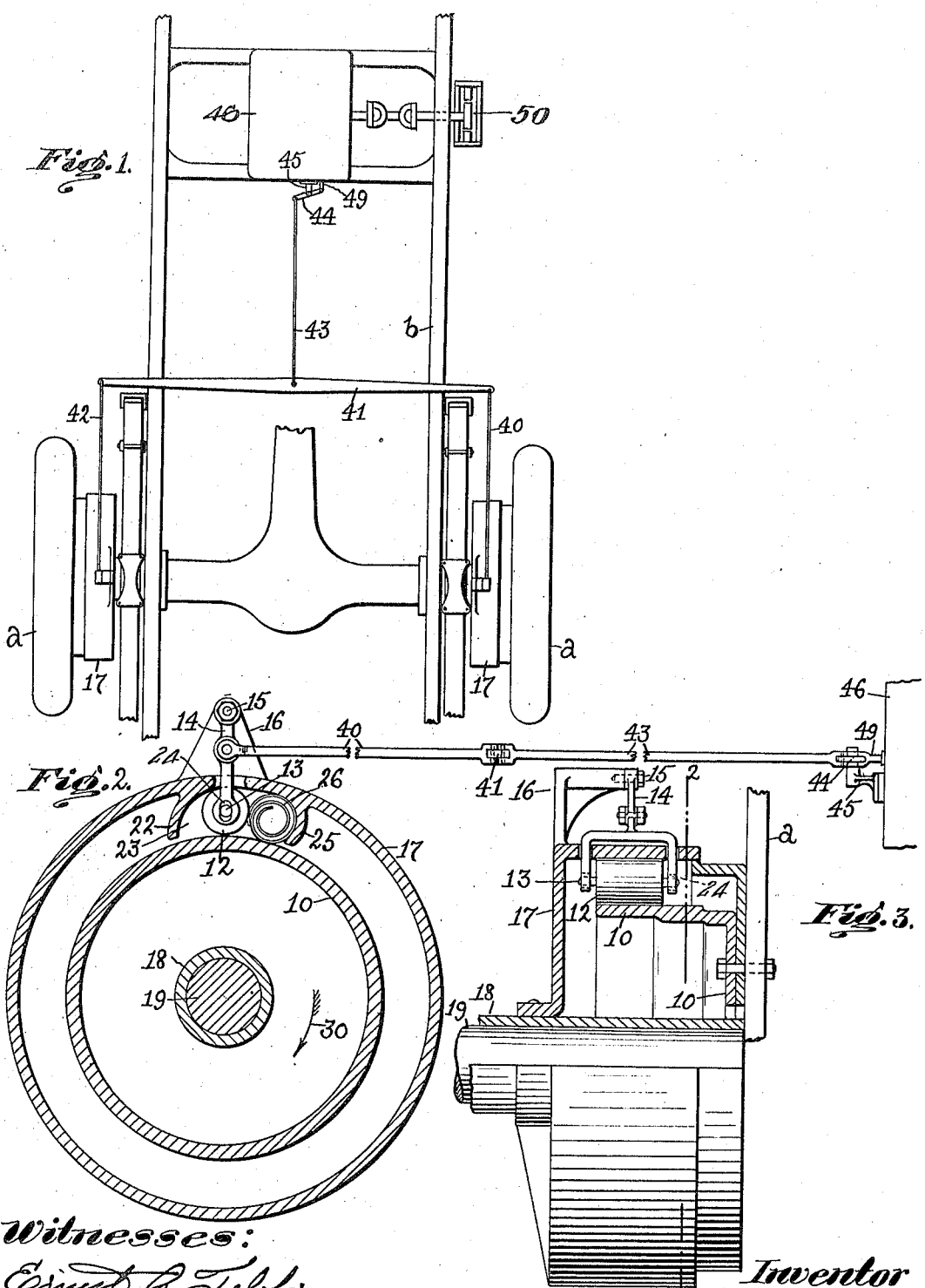

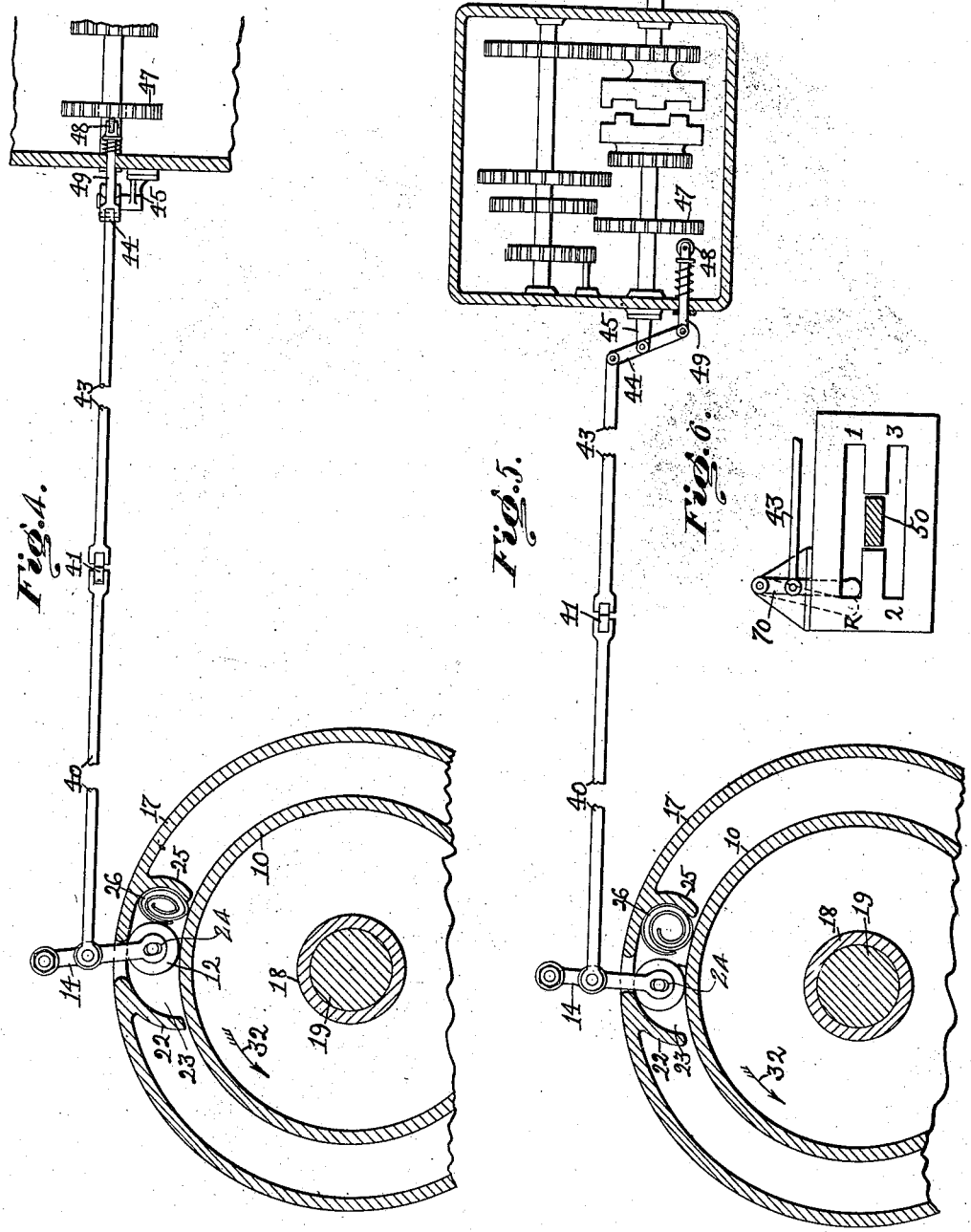

UNITED STATES PATENT OFFICE.

JAMES H. NEAL, OF CAMBRIDGE, MASSACHUSETTS.

SAFETY DEVICE FOR AUTOMOBILES.

1,200,750.  Specification of Letters Patent.  Patented Oct. 10, 1916.

Application filed March 25, 1915. Serial No. 17,021.

*To all whom it may concern:*

Be it known that I, JAMES H. NEAL, a citizen of the United States, residing in Cambridge, in the county of Middlesex and State of Massachusetts, have invented an Improvement in Safety Devices for Automobiles, of which the following description, in connection with the accompanying drawings, is a specification, like characters on the drawings representing like parts.

This invention relates to a safety device for automobiles, and like vehicles, which is automatically brought into action when the vehicle is unexpectedly moved backward. Provision is made for enabling the vehicle to be moved backward at the will of the operator. These and other features of this invention will be pointed out in the claims at the end of this specification.

Figure 1 is a plan view of a sufficient portion of an automobile provided with a safety device embodying this invention to enable it to be understood. Fig. 2, an elevation and partial section of the safety device shown in Fig. 1, the section being taken on the line 2—2, Fig. 3. Fig. 3, a rear elevation and partial section of the safety device shown in Fig. 1. Fig. 4, a section of the apparatus in its inoperative position to be referred to. Fig. 5, a section of the apparatus in its operative position, and Fig. 6, a detail illustrating a modified connection of the safety device with the control lever of the car.

In the present instance, I have illustrated the safety device as applied to the rear wheels *a* of an automobile *b* of known construction, such as now commonly used.

The safety device comprises a rotatable member and a locking or holding member therefor, and in the embodiment of the invention shown in Figs. 1 to 5, the rotatable member is shown as a drum 10, which is secured to one and preferably to both wheels *a*, and the locking or holding member is shown as a roller 12 mounted to turn freely on a pin 13 carried by a forked lever 14, which is pivoted at 15 to a bracket or arm 16 attached to a stationary drum 17, which may be riveted or otherwise secured to the housing 18 for the rear axle 19. The stationary drum 17 is of larger diameter than the rotatable drum or member 10, and the rim of the stationary drum 17 is provided on its under side with a lug or arm 22, which coöperates with the rim of the rotatable member 10 to form a wedge-shaped or contracted space 23 between the rims of the drums, which is of the full diameter of the roll at one end and diminishes toward the other end, so that, when the roll 12 is moved into the space 23 which it is permitted to do by providing for vertical play between the pin 13 and the lever 14, it becomes wedged between the drums and locks the rotatable drum or member 10 to the stationary drum 17 and thereby prevents the drum or member 10 from rotating, consequently locking the wheels *a* from rotating in a reverse direction. The vertical play between the pin 13 and lever 14 may be accomplished by providing suitable slots 24 in the lever into which the pin 13 extends.

The rim of the stationary drum 17 may be provided with a second arm 25 on the opposite side of the roll 12, and said arm serves as a back stop for a spring 26, herein shown as a coiled sheet metal spring, which coöperates with the roll 12 and normally keeps the latter in its central or normal position.

By reference to Fig. 2, it will be seen that when the roll 12 is in its central or normal position, the rotatable drum or member is capable of being turned freely in the direction of the arrow 30, as the roll 12 is in such position as to permit this movement of the drum 10. If, however, the roll 12 is moved into the contracted space 23, as represented in Fig. 5, which is effected by rotation of the drum 10 under abnormal conditions, as, for instance by the vehicle backing down a steep grade, while the motor mechanism is in neutral or in a forward position, and the usual brakes fail to hold the car, the said roll is wedged in the space 23 by the rotation of the drum 10 in the reverse direction indicated by the arrow 32 and prevents continued rotation of the drum 10 in the reverse direction, thereby bringing the vehicle to a standstill and avoiding accidents.

Provision is made for permitting the vehicle to be moved backward when the operating mechanism of the vehicle is reversed at the will of the operator, and to this end provision is made for moving the roll 12 away from the contracted space 23 and toward the backstop 25 as represented in Fig. 4, in which position the spring 26 is compressed and the roll 12 is inoperative to prevent the reverse rotation of the drum 10.

The movement of the roll 12 into its inoperative position shown in Fig. 4 is effected by some part of the reversing mechanism of the automobile, so that, when the operator of the car actuates the reversing mechanism, the latter moves the roll 12 into its inoperative position.

In the arrangement shown in Figs. 1 to 5, the lever 14 carrying the roll 12, which coöperates with the drum 10 carried by one wheel $a$, is connected by a link 40 to one end of a cross bar 41, which is connected by a like link 42, with the lever 14 carrying the roll 12, which coöperates with the drum 10 carried by the other wheel $a$, and the cross bar 41 is connected by a link 43 with one end of a lever 44, pivoted to a bracket or arm 45 attached to the box or casing 46 containing the usual transmitting gears, one of which as 47 may be considered the reversing gear, with which coöperates a roller 48 on a rod 49, extended through the wall of the box 48 connected with the lever 44.

It will be understood that the gear transmission herein represented, may be such as now commonly used on automobiles and is more or less conventionally shown, and that the shifting of the gears is effected by the usual control lever 50, shown only in section in Fig. 6, and which is operated by the chauffeur.

It will also be understood that when the control lever 50 is in its neutral position as shown in Fig. 6, or in any of the positions it occupies when the car is proceeding forward, which positions are numbered 1, 2 and 3 in Fig. 6, the reverse gear 47 occupies the position represented in Fig. 5, and at such time the rod 49 is not affected thereby and the roll 12 is in its central or normal position shown in Fig. 2. When, however, the chauffeur reverses the control lever 50 and moves it into the position marked R in Fig. 6, the reversing gear 47 is moved into the position shown, in Fig. 4, and acts on the rod 49 to turn the lever 44 so as to positively move the roll 12 into its inoperative position shown in Fig. 4, thereby permitting the drum to be turned in the reverse direction with the reverse movement of the wheels $a$, consequently allowing the vehicle to be backed in the usual manner.

In Fig. 6, I have represented the safety device as connected with a lever 70, which is arranged with relation to the control lever 50 so as to be moved thereby when the control lever is moved into the proper position to reverse the vehicle, which position is marked R in Fig. 6, the lever 70 having connected to it the rod 43. It will be understood that when the arrangement shown in Figs. 1 to 5 is used, the rod 43 is actuated by the reverse gear 47 and the lever 70 shown in Fig. 6 is not used.

From the above description it will be seen that an automobile embodying this invention is safeguarded against accidents on steep hills in cases where the brakes fail to hold and the motive power gives out or the motor is not sufficiently strong to propel the car forward.

Claims:

1. The combination with a motor vehicle provided with wheels and with mechanism for effecting a reverse movement of the vehicle, of a safety device for preventing unexpected reverse movement of said vehicle, said safety device comprising a rotatable drum, a stationary drum of larger diameter and forming with said rotatable drum an annular space, a device attached to said stationary drum and coöperating with said rotatable drum to form a contracted space between said drums, a roller located in the annular space between said drums and movable by reverse rotation of said rotatable drum into said contracted space, and means under control of the operator for preventing said roller from being moved into said contracted space by reverse rotation of said rotatable drum.

2. The combination with a motor vehicle provided with wheels and with mechanism for effecting a reverse movement of the vehicle, of a safety device for preventing unexpected reverse movement of said vehicle, said safety device comprising a rotatable drum, a stationary device coöperating with said drum to form therewith a contracted space, a device movable by reverse rotation of said drum into said contracted space to arrest continued reverse rotation of said drum, and means under control of the operator for rendering said device inoperative to arrest reverse rotation of said drum at the will of the operator.

In testimony whereof, I have signed my name to this specification in the presence of two subscribing witnesses.

JAMES H. NEAL.

Witnesses:
JAS. H. CHURCHILL,
J. MURPHY.